(12) United States Patent
Mercado et al.

(10) Patent No.: US 11,946,254 B2
(45) Date of Patent: Apr. 2, 2024

(54) ROOFING MATERIALS WITH IMPROVED LOW TEMPERATURE SEALANT PERFORMANCE AND METHODS OF MAKING THEREOF

(71) Applicant: Building Materials Investment Corporation, Dallas, TX (US)

(72) Inventors: Ramil Marcelo L. Mercado, Waxahachie, TX (US); Jarod L. Krajca, Ennis, TX (US); Ming-Liang Shiao, Basking Ridge, NJ (US); Denis M. Tibah, Waxahachie, TX (US); Daniel E. Boss, Morris Township, NJ (US)

(73) Assignee: BMIC LLC, Dallas, TX (US)

( * ) Notice: Subject to any disclaimer, the term of this patent is extended or adjusted under 35 U.S.C. 154(b) by 200 days.

(21) Appl. No.: 17/407,279

(22) Filed: Aug. 20, 2021

(65) Prior Publication Data
US 2022/0056695 A1  Feb. 24, 2022

Related U.S. Application Data

(60) Provisional application No. 63/068,528, filed on Aug. 21, 2020.

(51) Int. Cl.
*E04D 1/00* (2006.01)
*D06N 3/00* (2006.01)
(Continued)

(52) U.S. Cl.
CPC ............. *E04D 1/29* (2019.08); *D06N 3/0011* (2013.01); *D06N 3/0068* (2013.01); *D06N 3/10* (2013.01);
(Continued)

(58) Field of Classification Search
CPC .... E04D 1/29; E04D 1/20; E04D 1/28; E04D 1/34; E04D 1/26; E04D 2001/005;
(Continued)

(56) References Cited

U.S. PATENT DOCUMENTS 2,421,892 A   6/1947  Kirschbraun
2,719,804 A  10/1955  Carlson
(Continued)

FOREIGN PATENT DOCUMENTS

CA   2097457 C   8/1997
CN   2934435 Y   8/2007
(Continued)

OTHER PUBLICATIONS

Fred A. Mazzeo, "Characterization of Pressure Sensitive Adhesives by Rheology"—available from TA Instruments; dated Jan. 2002.
(Continued)

*Primary Examiner* — Nathan L Van Sell
(74) *Attorney, Agent, or Firm* — Venable LLP

(57) ABSTRACT

This invention, in embodiments, relates to a roofing material comprising (a) a coated or covered substrate and (b) a single sealant applied to a surface of the coated or covered substrate, with the single sealant being free of asphalt. The single sealant exhibits a minimum activation temperature (° C.) (tan $\delta$>1) from −10° C. to 0° C. The single sealant is configured to adhere the roofing material to at least one of (i) an underlying roofing material, (ii) an overlying roofing material, and (iii) a roofing deck substrate.

20 Claims, 9 Drawing Sheets

(51) Int. Cl.
*D06N 3/10* (2006.01)
*D06N 5/00* (2006.01)
*E04D 1/20* (2006.01)
*E04D 1/26* (2006.01)
*E04D 1/28* (2006.01)
*E04D 1/34* (2006.01)

(52) U.S. Cl.
CPC ............... *D06N 5/00* (2013.01); *E04D 1/20* (2013.01); *E04D 1/28* (2013.01); *E04D 1/34* (2013.01); *D06N 2211/06* (2013.01); *E04D 2001/005* (2013.01); *E04D 1/26* (2013.01); *E04D 2001/3435* (2013.01)

(58) Field of Classification Search
CPC .......... E04D 2001/3435; D06N 3/0011; D06N 3/0068; D06N 3/10; D06N 5/00; D06N 2211/06; C09J 153/02
See application file for complete search history.

(56) References Cited

U.S. PATENT DOCUMENTS

| | | | |
|---|---|---|---|
| 3,032,928 | A | 5/1962 | Jackson, Jr. |
| 3,138,897 | A | 6/1964 | Mccorkle |
| 3,252,257 | A | 5/1966 | Price et al. |
| 4,559,267 | A | 12/1985 | Freshwater et al. |
| 4,755,545 | A | 7/1988 | Lalwani |
| 4,824,880 | A | 4/1989 | Algrim et al. |
| 4,923,913 | A | 5/1990 | Chich et al. |
| 5,011,726 | A | 4/1991 | Chich et al. |
| 5,295,340 | A | 3/1994 | Collins |
| 5,380,552 | A | 1/1995 | George et al. |
| 5,951,809 | A | 9/1999 | Jenkins et al. |
| 6,399,711 | B1 | 6/2002 | Kawasaki et al. |
| 6,968,662 | B2 | 11/2005 | Rodrigues |
| 7,125,601 | B1 | 10/2006 | Pinault et al. |
| 7,524,910 | B2 | 4/2009 | Jiang et al. |
| 7,537,820 | B2 | 5/2009 | Kalkanoglu et al. |
| 7,589,145 | B2 | 9/2009 | Brant et al. |
| 8,088,858 | B2 | 1/2012 | Pham |
| 8,925,272 | B1 | 1/2015 | Amatruda et al. |
| 9,574,350 | B2 | 2/2017 | Loftus et al. |
| 9,932,739 | B2 | 4/2018 | Verhoff et al. |
| 10,358,824 | B2 | 7/2019 | Aschenbeck et al. |
| 2004/0107664 | A1* | 6/2004 | Rodrigues ................ E04D 1/26 52/557 |
| 2012/0041117 | A1 | 2/2012 | Aerts et al. |
| 2013/0025225 | A1 | 1/2013 | Vermilion et al. |
| 2014/0024757 | A1 | 1/2014 | Aerts et al. |
| 2014/0208675 | A1* | 7/2014 | Beerer ..................... E04D 1/28 156/60 |
| 2017/0298579 | A1 | 10/2017 | Kuhn et al. |
| 2019/0309519 | A1 | 10/2019 | Folkersen et al. |
| 2019/0330850 | A1 | 10/2019 | Verhoff et al. |
| 2020/0011060 | A1 | 1/2020 | Haynes et al. |

FOREIGN PATENT DOCUMENTS

| | | |
|---|---|---|
| CN | 103866976 A | 6/2014 |
| CN | 104358362 A | 2/2015 |
| JP | 2009221297 A | 10/2009 |

OTHER PUBLICATIONS

M-1 Structural Adhesive/Sealant—available from Chem Link Products, LLC; dated Oct. 17, 2013; <<https://www.pestmaterials.com/pdf_files/m1-sealant.pdf>>.

CT1: The Ultimate Roof Sealant—available from C-Tec N.I Limited.; dated Oct. 30, 2019; <<https://www.ct1.com/product-applications/ct1-the-ultimate-roof-sealant/>>.

Geocel Roof Pro Tripolymer Sealant—available from GEOCEL; dated Oct. 30, 2019; <<https://www.geocelusa.com/product/geocel-roof-pro-tripolymer-sealant/>>.

Shaomin Sun et al., "A review on mechanical properties of pressure sensitive adhesives"—available from the International Journal of Adhesion & Adhesives; dated Oct. 10, 2012.

Mar. 2, 2023 International Preliminary Report on Patentability in International Patent Application No. PCT/US2021/047095.

Notification of Transmittal of the International Search Report and the Written Opinion dated Dec. 20, 2021, in counterpart International Patent Application No. PCT/US2021/047095.

* cited by examiner

| Material | Activation Temp., °C (tan δ>1, 1 Hz) | Dahlquist criterion temp., °C (G'<3x105 Pa at 0.01 Hz) | Peel Strength at 60°C (140°F); Pa (G" at 30 Hz) | Peel Strength at 25°C (77°F); Pa (G" at 30 Hz) | Shear resistance at 60°C (140°F), Pa (G' at 0.01 Hz) | Creep Resistance at 70°C (158°F), Pa (G" at 0.01 Hz) |
|---|---|---|---|---|---|---|
| Comparative Examples | | | | | | |
| Asphaltic Sealant 1 | 17.5 (63.5°F) | 24 (76°F) | 3.59x10$^5$ | 3.07x10$^7$ | 2341 | 1135 |
| Asphaltic Sealant 2 | 20 (68°F) | 20 (68°F) | 1.96x10$^5$ | 9.04x10$^6$ | 518 | 917 |
| Non-Asphaltic Sealants | | | | | | |
| HBFuller Swiftmelt 81570 | -5 (23°F) | 0 (32°F) | 4.67x10$^4$ | 4.6x10$^6$ | 10959 | 1071 |
| LORD HM 17-1 | -10 (14°F) | 0 (32°F) | 1.64x10$^4$ | 1.36x10$^6$ | 15355 | 5322 |
| PS2200 PSA | -7.5 (18.5°F) | -2.5 (27.5°F) | 2.62x10$^4$ | 1.07x10$^6$ | 1290 | 308 |
| Cattie C52-810C PLW | -5 (23°F) | -5 (23°F) | 2.41x10$^4$ | 1.59x10$^6$ | 2581 | 3138 |
| Acrynax 10127 | 67 (153°F) | 0 (32°F) | 5.36x10$^4$ | 5.89x10$^5$ | 2143 | 1191 |

*FIG. 4*

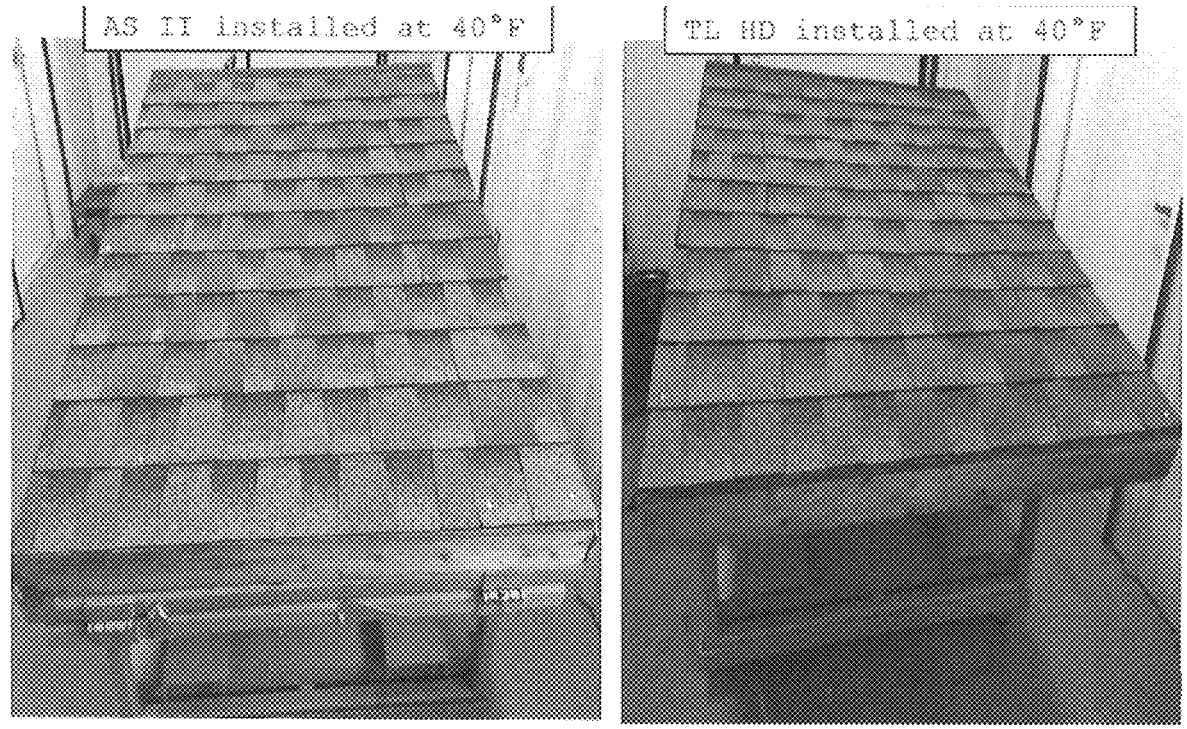
FIG. 7A  FIG. 7B
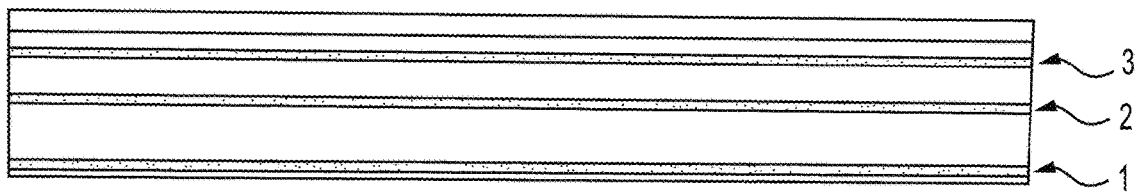
FIG. 8

| Sealant Samples | Material | Softening Point (°F) | Viscosity (360°F) (cps) | Penetration (77°F) (dmm) | Tack Temp. (°F) | Activation (lb-f) | | | Mechanical Uplift (lb-f) | Spread | |
|---|---|---|---|---|---|---|---|---|---|---|---|
| | | | | | | 70°F | 80°F | 110°F | | Caliper loss (in) | Width increase (in) |
| 1 | 100% NA Sealant | 199 | 8000-17000 at 350°F | No data | <40 | 2.2 | No data | 11.6 | 44.7 | 0.03 | 0.3 |
| 2 | 75/25 PMA Sealant / NA Sealant | 223 | No data | 44 | 55 | 5.3 | No data | No data | 21.8 | No data | No data |
| 3 | 50/50 PMA Sealant / NA Sealant | 199 | No data | 47 | 40 | 3.3 | No data | No data | 31.5 | No data | No data |
| 4 | 25/75 PMA Sealant / NA Sealant | 196 | No data | 58 | 40 | 6.4 | No data | No data | 28.5 | No data | No data |

ROOFING MATERIALS WITH IMPROVED LOW TEMPERATURE SEALANT PERFORMANCE AND METHODS OF MAKING THEREOF

FIELD OF THE INVENTION

This invention relates to roofing materials with improved low temperature sealant performance and methods of making such roofing materials. The roofing materials include a sealant that is generally free of asphalt and exhibits a minimum activation temperature at relatively low temperatures (e.g., less than 4° C. (40° F.)). Roofing materials, such as shingles, that include this sealant exhibit superior properties of, for example, low temperature adhesion performance and increased wind uplift resistance, as compared to roofing materials without such a sealant.

BACKGROUND OF THE INVENTION

Typically, roofing materials, such as, e.g., shingles, are based upon a fiberglass or felt mat that is coated and impregnated with an asphalt-based composition that is subsequently coated with granules. Generally, these roofing materials further include a sealant that is applied at one or more locations on a backing during the time of manufacturing. During this application step, the sealant is generally in the form of a molten asphaltic sealant. When the sealant cools into a solid form after manufacturing and during installation of the roofing material, the sealant is generally placed into contact with another previously installed roofing material where adhesion between the roofing materials will later be activated by solar heat, so that the roofing materials can resist wind uplift when the sealant cures. In this case, the sealant may be activated at elevated temperatures (e.g., activation temperatures of greater than 15° C. (60° F.)). As a result, these sealants may not be capable of activation at relatively low temperatures (e.g., less than 10° C. (50° F.)). Thus, roofing materials having these sealants, which are applied during cold weather, have the potential of not being fully sealed and detaching from the roof if there is a high wind or storm prior to activation of the sealant.

There is therefore a need for a roofing material having a sealant that exhibits superior properties of, for example, low temperature adhesion performance and increased wind uplift resistance of the roofing materials, when installed at relatively low temperatures (e.g., less than 10° C. (50° F.)), indeed, even at temperatures less than 4° C. (40° F.).

SUMMARY OF THE INVENTION

One embodiment of this invention pertains to a roofing material comprising (a) a coated or covered substrate and (b) a single sealant applied to a surface of the coated or covered substrate, with the single sealant being free of asphalt. In the embodiment, the single sealant exhibits a minimum activation temperature (° C.) (tan δ>1) from −10° C. to 0° C. In the embodiment, the single sealant is configured to adhere the roofing material to at least one of (i) an underlying roofing material, (ii) an overlying roofing material, and (iii) a roofing deck substrate.

In one embodiment, the single sealant comprises at least one polymer. According to one embodiment, the at least one polymer comprises a styrene block copolymer. According to another embodiment, the single sealant further comprises at least one of (i) resins, (ii) plasticizers, (iii) fillers, (iv) tackifiers, (v) other modifiers or (vi) combinations thereof.

In one embodiment, the roofing material is a roofing shingle. According to one embodiment, the roofing shingle is one of (i) an asphaltic shingle, (ii) a non-asphaltic shingle, and (ii) a polymer-modified asphalt shingle.

In one embodiment, the substrate comprises one of a fiberglass mat, a polyester mat, a scrim, a coated scrim, or a combination thereof.

In some embodiments, the roofing material further comprises granules.

In one embodiment, the roofing material further comprises an adhesive for adhering a layer of the roofing material (e.g., upper layer) to a backer strip of the roofing material. According to one embodiment, the adhesive is the same as the single sealant.

In one embodiment, the sealant exhibits a minimum activation temperature (° C.) (tan δ>1) from −10° C. to −5° C.

In one embodiment, the roofing material exhibits a wind uplift resistance, as measured according to ASTM D6381, of 5 lb-f to 63 lb-f. In one embodiment, the roofing material exhibits a wind uplift resistance, as measured according to ASTM D6381, of 20 lb-f to 30 lb-f.

In one embodiment, the roofing material exhibits a shear resistance at 60° C. of 200 Pa to 20,000 Pa, as measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives," 41 (2013), pages 98-106, both of which are incorporated by reference herein. In one embodiment, the roofing material exhibits a shear resistance at 60° C. of 1000 Pa to 20,000 Pa.

In one embodiment, the roofing material exhibits (i) a peel strength at 25° C. of $1 \times 10^4$ Pa (1.5 psi) to $1 \times 10^7$ Pa (1450 psi) and (ii) a peel strength at 60° C. of $1 \times 10^4$ Pa (1.5 psi) to $1 \times 10^6$ Pa (145 psi), with the peel strength being measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives," 41 (2013), pages 98-106, both of which are incorporated by reference herein, as discussed above. In some embodiments, the roofing material exhibits (i) a peel strength at 25° C. of $1 \times 10^6$ Pa (145 psi) to $6 \times 10^6$ Pa (900 psi), and (ii) a peel strength at 60° C. of $1 \times 10^4$ Pa (1.5 psi) to $4 \times 10^5$ Pa (60 psi).

Another embodiment of this invention pertains to a roofing material comprising (a) a coated or covered substrate and (b) a sealant applied to a surface of the coated or covered substrate, the sealant comprising a styrene polymer or copolymer and a filler, and the sealant being free of asphalt. The sealant is configured to adhere the roofing material to at least one of (i) an underlying roofing material, (ii) an overlying roofing material, and (iii) a roofing deck substrate.

In one embodiment, the sealant further comprises at least one of (i) resins, (ii) plasticizers, (iii) tackifiers, (iv) other modifiers or (v) combinations thereof.

In one embodiment, the roofing material is a roofing shingle. According to one embodiment, the roofing shingle is one of (i) an asphaltic shingle, (ii) a non-asphaltic shingle, and (ii) a polymer-modified asphalt shingle.

In one embodiment, the substrate comprises one of a fiberglass mat, a polyester mat, a scrim, a coated scrim, or a combination thereof.

In some embodiments, the roofing material further comprises granules.

In one embodiment, the roofing material further comprises an adhesive for adhering a layer of the roofing material (e.g., an upper layer) to a backer strip of the roofing material. According to one embodiment, the adhesive is the same as the single sealant.

In one embodiment, the sealant exhibits a minimum activation temperature (° C.) (tan δ>1) from −10° C. to 0° C. In some embodiments, the sealant exhibits a minimum activation temperature (° C.) (tan δ>1) from −10° C. to −5° C.

In one embodiment, the roofing material exhibits a wind uplift resistance, as measured according to ASTM D6381, of 5 lb-f to 63 lb-f. In one embodiment, the roofing material exhibits a wind uplift resistance, as measured according to ASTM D6381, of 20 lb-f to 30 lb-f.

In one embodiment, the roofing material exhibits a shear resistance at 60° C. of 200 Pa to 20,000 Pa, as measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives," 41 (2013), pages 98-106, both of which are incorporated by reference herein. In one embodiment, the roofing material exhibits a shear resistance at 60° C. of 1000 Pa to 20,000 Pa.

In one embodiment, the roofing material exhibits (i) a peel strength at 25° C. of $1\times10^4$ Pa (1.5 psi) to $1\times10^7$ Pa (1450 psi) and (ii) a peel strength at 60° C. of $1\times10^4$ Pa (1.5 psi) to $1\times10^6$ Pa (145 psi), with the peel strength being measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives," 41 (2013), pages 98-106, both of which are incorporated by reference herein, as discussed above. In some embodiments, the roofing material exhibits (i) a peel strength at 25° C. of $1\times10^6$ Pa (145 psi) to $6\times10^6$ Pa (900 psi), and (ii) a peel strength at 60° C. of $1\times10^4$ Pa (1.5 psi) to $4\times10^5$ Pa (60 psi).

In some embodiments, the sealant is the only sealant applied to the roofing material for adhering the roofing material to the at least one of (i) an underlying roofing material, (ii) an overlying roofing material, and (iii) a roofing deck substrate.

Another embodiment of this invention pertains to a roofing system comprising (a) a first roofing material comprising (i) a coated or covered substrate and (ii) a single sealant applied to a surface of the coated or covered substrate, with the single sealant being free of asphalt and the single sealant exhibiting a minimum activation temperature (° C.) (tan δ>1) from −10° C. to 0° C. The roofing system further comprises a second roofing material, wherein the second roofing material is adhered to the first roofing material via the single sealant.

In one embodiment, the roofing system further comprises a roofing deck substrate that is positioned below and adhered to the first roofing material.

Another embodiment of this invention pertains to a sealant for adhering a layer of a roofing material (e.g., an upper layer) to a backer strip of the roofing material, the sealant being free of asphalt and exhibiting a minimum activation temperature (° C.) (tan δ>1) from −10° C. to 0° C. In the embodiment, the sealant is configured to adhere the layer of the roofing material to the backer strip of the roofing material in at least one of (i) a common bond area, (ii) portions of one or more tabs of the roofing material that attach to the backer strip, or (iii) a combination of (i) and (ii).

Another embodiment of this invention pertains to a sealant for adhering a layer of a roofing material (e.g., an upper layer) to a backer strip of the roofing material, the sealant comprising a styrene polymer or copolymer and a filler, and the sealant being free of asphalt. The sealant is configured to adhere the layer of the roofing material to the backer strip of the roofing material in at least one of (i) a common bond area, (ii) portions of one or more tabs of the roofing material that attach to the backer strip, or (iii) a combination of (i) and (ii).

BRIEF DESCRIPTION OF THE FIGURES

For a more complete understanding of the invention and the advantages thereof, reference is made to the following descriptions, taken in conjunction with the accompanying figures, in which:

FIG. 4 is a table illustrating activation temperatures and other properties of various sealants according to embodiments of the invention.

FIGS. 7A and 7B are photographs of test decks constructed with shingles having a sealant applied thereto according to embodiments of the invention.

FIG. 8 is a photograph of a roofing shingle that shows the location of three individual sealant lines according to an embodiment of the invention.

FIG. 10 is a table illustrating activation temperatures and other properties of various sealants according to embodiments of the invention.

DETAILED DESCRIPTION OF THE INVENTION

Figure 1:
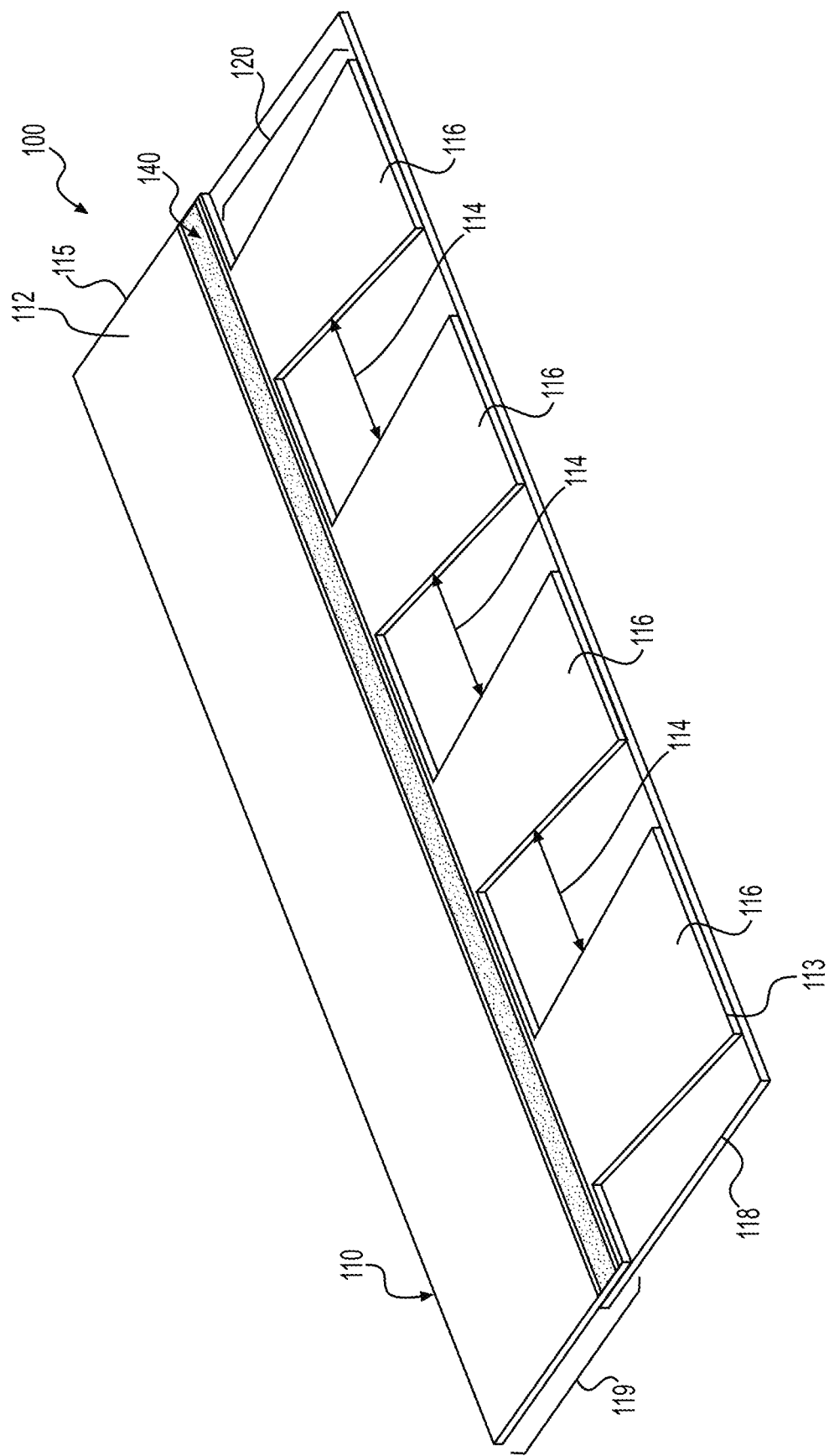
FIG. 1 is an illustration of a roofing material with a sealant (illustrated in FIG. 2) according to an embodiment of the invention.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though they may. Furthermore, the phrases "in another embodiment" and "in some other embodiments" as used herein do not necessarily refer to a different embodiment, although they may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising," "including," and "having" do not limit the scope of a specific claim to the materials or steps recited by the claim.

As used herein, terms such as "consisting of" and "composed of" limit the scope of a specific claim to the materials and steps recited by the claim.

All prior patents, publications, and test methods referenced herein are incorporated by reference in their entireties.

As used herein, the term "coated substrate" means a substrate that is coated on one side (upper surface or lower surface) or both sides (upper surface and lower surface) with a coating that includes, for example, an asphaltic coating, a non-asphaltic coating, and/or a polymer-modified asphalt coating.

As used herein, the term "covered substrate" means a substrate that is covered on one side (upper surface or lower surface) or both sides (upper surface and lower surface) with a covering that includes, for example, a laminate.

As used herein, the term "free of asphalt" means that the sealant is substantially free of asphalt, namely, less than 10% by weight of asphalt.

As used herein, the term "weight percent" or "% by weight" means the percentage by weight of a component based upon a total weight of the sealant.

As used herein, the term "roofing material" includes, but is not limited to, shingles, waterproofing membranes, underlayment, and tiles. According to one embodiment, the "roofing materials" may or may not be roll applied.

One embodiment of this invention pertains to a roofing material comprising (a) a coated or covered substrate and (b) a single sealant applied to a surface of the coated or covered substrate, with the single sealant being free of asphalt. The single sealant exhibits a minimum activation temperature (° C.) (tan δ>1) from −10° C. to 0° C. The single sealant is configured to adhere the roofing material to at least one of (i) an underlying roofing material, (ii) an overlying roofing material, and (iii) a roofing deck substrate.

Another embodiment of this invention pertains to a roofing material comprising (a) a coated or covered substrate and (b) a sealant applied to a surface of the coated or covered substrate, the sealant comprising a styrene polymer or copolymer and a filler, and the sealant being free of asphalt. The sealant is configured to adhere the roofing material to at least one of (i) an underlying roofing material, (ii) an overlying roofing material, and (iii) a roofing deck substrate.

Figure 2:
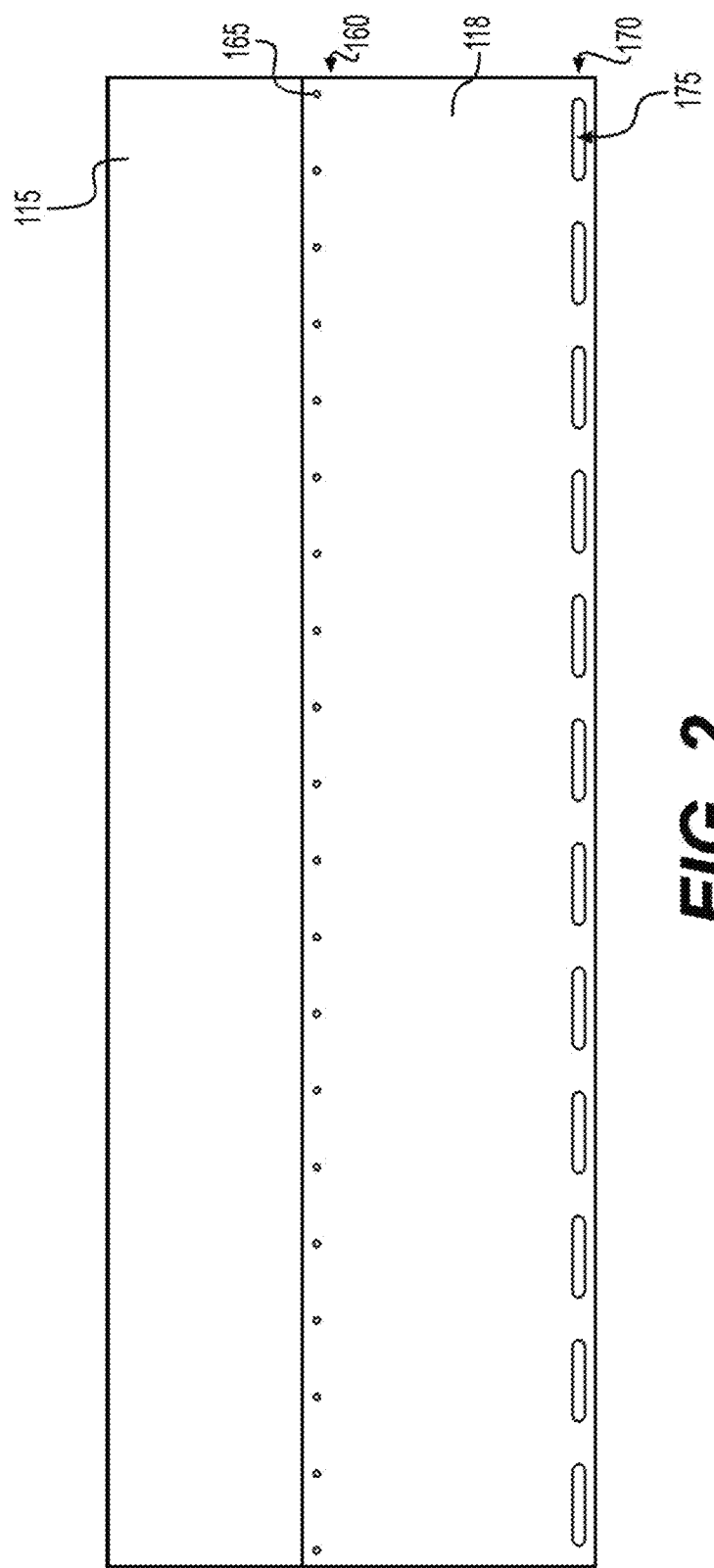
FIG. 2 is an illustration of a bottom view of the roofing material shown in FIG. 1, according to an embodiment of the invention.

FIG. 1 illustrates a roofing material (e.g., shingle) 100 according to an embodiment of the invention. In this embodiment, the roofing material 100 includes an upper layer 110 having a front surface 112 and a back surface 115. The roofing material 100 further includes an upper portion or headlap portion 119 and a lower portion or buttlap portion 120. The buttlap portion 120 includes a series of cut-outs 114 leaving a plurality of tabs 116. The edge 113 of the buttlap portion 120 will be the lowermost or bottom edge of the roofing material 100 when installed onto a roof. Attached and/or laminated to the back surface 115 of the upper layer 110 of the roofing material 100 is a backer strip 118. As shown in FIG. 1, the upper surface of the backer strip 118 is visible between the tabs 116 of the buttlap portion 120 of the upper layer 110 of the roofing material 100. FIG. 2 illustrates one embodiment of the underside of the roofing material 100 of FIG. 1, in which the backer strip 118 is attached to the back surface 115 of the upper layer 110 of the roofing material 100 in a region or nail zone 160 via a plurality of mechanical fasteners 165. Non-limiting examples of various types of mechanical fasteners are detailed in U.S. Pat. No. 8,006,457, as well as U.S. patent application Ser. No. 16/533,032, the contents of which are hereby incorporated reference. In an embodiment, the backer strip 118 is attached to the back surface 115 of the upper layer 110 of the roofing material 100 with an adhesive (not shown) and with few to no mechanical fasteners (e.g., fasteners 165). In another embodiment, the backer strip 118 is attached to the back surface 115 of the upper layer 110 of the roofing material 100 with an adhesive that comprises a sealant (e.g., sealant 175) according to embodiments of the invention (e.g., a sealant that is free of asphalt and exhibits a minimum activation temperature (° C.) (tan δ>1) from −10° C. to 0° C.). According to one embodiment, the backer strip 118 is attached to the back surface 115 of the upper layer 110 of the roofing material 100 with an adhesive that comprises a sealant according to embodiments of the invention, as discussed above, in (i) the nail zone 160 (also considered a common bond area), (ii) portions of the tabs 116 that attach to the backer strip 118, and/or (iii) combinations thereof.

As also shown in the embodiment of FIG. 2, a line 170 of sealant 175 is also provided along a lower edge of the backer strip 118. This line 170 of sealant 175 is configured to attach the roofing material 100 to at least one of (i) a portion (e.g., sealant attachment portion 140 of FIG. 1) of a previously installed or underlying roofing material, and (ii) a roofing deck substrate that is applied to, for example, a roof (see, e.g., roofing deck substrate 210 applied to roof 250 of FIG. 3). Although the embodiment of FIG. 2 illustrates a line 170 of sealant 175 that comprises a plurality of spaced apart dots of sealant 175, the sealant 175 could also be provided as a single line of sealant, multiple lines of sealant, or combinations thereof.

The roofing material 100 of the embodiment of FIG. 1 further includes a sealant attachment portion 140 disposed on the front surface 112 of the roofing material 100, in the area in which the headlap portion 119 meets the buttlap portion 120. According to one embodiment, the sealant attachment portion 140 is disposed on the front surface 112 of the roofing material 100 in an area in which the roofing material 100 will directly contact a sealant(s) (e.g., sealant 175 of FIG. 2) of a roofing material (e.g., shingle) that is placed immediately above the roofing material 100 of FIG. 1.

In an embodiment, the sealant is a single sealant (e.g., sealant 175 of FIG. 2) or the only sealant applied to the roofing material for adhering the roofing material to at least one of (i) an underlying roofing material, (ii) an overlying roofing material, and (iii) a roofing deck substrate. In an embodiment, the sealant is one of two or more sealants applied to the roofing material for adhering the roofing material to at least one of (i) an underlying roofing material, (ii) an overlying roofing material, and (iii) a roofing deck substrate. In an embodiment, the sealant is one of three or more sealants applied to the roofing material for adhering the roofing material to at least one of (i) an underlying roofing material, (ii) an overlying roofing material, and (iii) a roofing deck substrate. In an embodiment, the sealant is one of four or more sealants applied to the roofing material for adhering the roofing material to at least one of (i) an underlying roofing material, (ii) an overlying roofing material, and (iii) a roofing deck substrate. In an embodiment, the sealant is one of five or more sealants applied to the roofing material for adhering the roofing material to at least one of (i) an underlying roofing material, (ii) an overlying roofing material, and (iii) a roofing deck substrate.

In some embodiments, the sealant comprises at least one polymer. In one embodiment, the at least one polymer comprises a styrene polymer or copolymer. In some embodiments, the at least one polymer comprises a styrene block copolymer. Non-limiting examples of polymers include polyolefins, vinyl polymers and/or polyvinyl esters, and/or thermoplastic elastomers including, for example, polyethylene (including raw and/or recycled low density polyethylene (LDPE), linear low density polyethylene (LLDPE), and/or high density polyethylene (HDPE)), polypropylenes (e.g., isotactic polypropylene (IPP) and/or atactic polypropylene (APP/IPP)), polystyrene, polyurethane (PU/TPU), polyurea, terpolymers (e.g., a functionalized polymer with a reactive oxygen group), amorphous polyalpha olefins (APAO), amorphous polyolefins (APO), including, e.g., propylene homopolymers and/or copolymers of propylene and ethylene, copolymers of ethylene alpha-olefin, such as ethylene and octene, ethylene and hexane, and ethylene and butene, polyolefin elastomers (POE), styrene/styrenic block copolymers, including, for example, styrenic block copolymers with a hydrogenated midblock of styrene-ethylene/butylene-styrene (SEBS) or styrene-ethylene/propylene-styrene (SEPS), styrene-isoprene-styrene block copolymers (SIS), or styrene-butadiene-styrene block copolymers (SBS), ethylene vinyl acetate (EVA), polyisobutylene, polybutadiene, oxidized polyethylene, epoxy thermoplastics, raw polyvinyl butyral (PVB) and/or recycled polyvinyl butyral (rPVB), polyvinyl acetate (PVAC), poly(vinyl butyrate), poly(vinyl propionate), poly(vinyl formate), copolymers of PVAC such as EVA, and combinations thereof.

In an embodiment, the sealant further comprises a filler. In an embodiment, the filler comprises at least one of an organic filler, an inorganic mineral filler, and combinations thereof. In an embodiment, the filler includes one or more of calcium carbonate, barium sulfate, calcium sulfate, talc, limestone, perlite, silica, fumed silica, precipitated silica, quartz, aluminum trihydrate, magnesium hydroxide, colemanite (e.g., hydrated calcium borate), titanium dioxide, snow white (i.e., calcium sulfate), fly ash, graphene nanoparticles, carbon black, recycled rubber tires, recycled shingles, recycled thermoplastic resins, basalt, roofing granules, clay, and combinations thereof. In an embodiment, the filler includes a high aspect ratio filler such as, e.g., graphene nanoparticles or carbon black. In an embodiment, the filler is a recycled material, such as post-consumer recycled asphalt shingles (PCRAS), ground tire rubber (GTR), acrylonitrile rubber (NBR), acrylonitrile butadiene styrene rubber (ABS), or other recycled thermoplastic(s).

In an embodiment, the sealant further comprises at least one of (i) resins, (ii) plasticizers, (iii) tackifiers, (iv) other modifiers or (v) combinations thereof. In an embodiment, the sealant further comprises a fire-retardant material.

In an embodiment, the sealant comprises 10% to 70% by weight of filler. In an embodiment, the sealant comprises 20% to 70% by weight of filler. In an embodiment, the sealant comprises 30% to 70% by weight of filler. In an embodiment, the sealant comprises 40% to 70% by weight of filler. In an embodiment, the sealant comprises 50% to 70% by weight of filler. In an embodiment, the sealant comprises 60% to 70% by weight of filler. In an embodiment, the sealant comprises 10% to 60% by weight of filler. In an embodiment, the sealant comprises 20% to 60% by weight of filler. In an embodiment, the sealant comprises 30% to 60% by weight of filler. In an embodiment, the sealant comprises 40% to 60% by weight of filler. In an embodiment, the sealant comprises 50% to 60% by weight of filler. In an embodiment, the sealant comprises 10% to 50% by weight of filler. In an embodiment, the sealant comprises 20% to 50% by weight of filler. In an embodiment, the sealant comprises 30% to 50% by weight of filler. In an embodiment, the sealant comprises 40% to 50% by weight of filler.

In an embodiment, the roofing material is a roofing shingle. In some embodiments, the roofing shingle is one of (i) an asphaltic shingle, (ii) a non-asphaltic shingle, and (ii) a polymer-modified asphalt shingle. According to one embodiment, the roofing shingle is one of (i) a single layer shingle or (ii) a laminated shingle having two or more layers.

In an embodiment, the substrate comprises one of a fiberglass mat, a polyester mat, a scrim, a coated scrim, or a combination thereof. In an embodiment, the substrate comprises a fiberglass mat, a polyester mat, a scrim, a coated scrim, and/or other synthetic or natural scrims. In some embodiments, the substrate or mat includes nano-fibrillated cellulose fibers.

In an embodiment, the roofing material further includes granules.

In an embodiment, the roofing material further comprises an adhesive for adhering a layer of the roofing material (e.g., an upper layer) to a backer strip of the roofing material. According to one embodiment, the adhesive is the same as the single sealant. For example, as discussed above, according to one embodiment, the backer strip 118 of FIGS. 1 and 2 can be attached to the back surface 115 of the upper layer 110 of the roofing material 100 with an adhesive that comprises a sealant (e.g., sealant 175) according to embodiments of the invention (e.g., a sealant that is free of asphalt and exhibits a minimum activation temperature (° C.) (tan δ>1) from −10° C. to 0° C.). According to one embodiment, the backer strip 118 is attached to the back surface 115 of the upper layer 110 of the roofing material 100 with an adhesive that comprises a sealant according to embodiments of the invention, as discussed above, in (i) the nail zone 160 (also considered a common bond area), (ii) portions of the tabs 116 that attach to the backer strip 118, and/or (iii) combinations thereof.

Another embodiment of this invention pertains to a roofing system comprising (a) a first roofing material comprising (i) a coated or covered substrate and (ii) a single sealant applied to a surface of the coated or covered substrate, with the single sealant being free of asphalt and the single sealant exhibiting a minimum activation temperature (° C.) (tan δ>1) from −10° C. to 0° C. The roofing system further comprises a second roofing material, wherein the second roofing material is adhered to the first roofing material via the single sealant.

In an embodiment, the roofing system further comprises a roofing deck substrate that is positioned below and adhered to the first roofing material.

Figure 3:
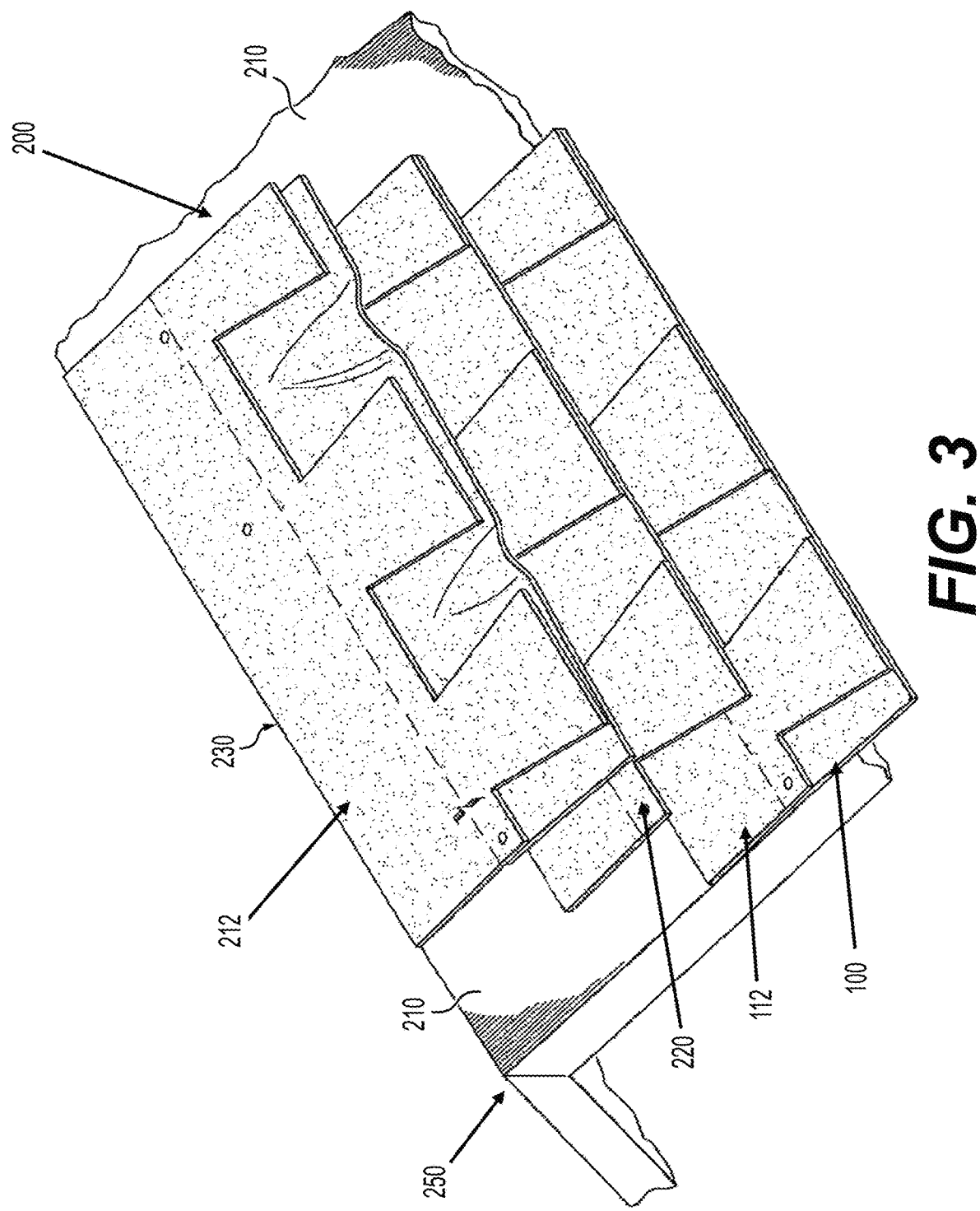
FIG. 3 is an illustration of a roofing system according to an embodiment of the invention.

FIG. 3 illustrates a roofing system 200 according to an embodiment of the invention. In this embodiment, the roofing system 200 comprises a first roofing material 100 (with similar features to those discussed above with respect to FIGS. 1 and 2), a second roofing material 220, and a third roofing material 230. According to this embodiment, the first roofing material 100 is adhered to a roofing deck substrate 210 that is applied to a roof 250, the second roofing material 220 is adhered to the first roofing material 100, and the third roofing material 230 is adhered to the second roofing material 220. The adhering of each of the roofing materials (100, 220, and 230) to each other and the adhering of first roofing material 100 to the roofing deck substrate 210 is accomplished via a sealant (e.g., sealant 175 of FIG. 2) according to embodiments of the invention. According to another embodiment, an additional roofing material (not shown) could be adhered to the front surface 212 of the third roofing material 230 shown in FIG. 3.

Another embodiment of this invention pertains to a sealant for adhering a layer of a roofing material (e.g., an upper layer) to a backer strip of the roofing material, the sealant being free of asphalt and exhibiting a minimum activation temperature (° C.) (tan δ>1) from −10° C. to 0° C. In the embodiment, the sealant is configured to adhere the layer of the roofing material to the backer strip of the roofing material in at least one of (i) a common bond area, (ii) portions of one or more tabs of the roofing material that attach to the backer strip, or (iii) a combination of (i) and (ii).

Another embodiment of this invention pertains to a sealant for adhering a layer of a roofing material (e.g., an upper layer) to a backer strip of the roofing material, the sealant comprising a styrene polymer or copolymer and a filler, and the sealant being free of asphalt. The sealant is configured to adhere the layer of the roofing material to the backer strip of the roofing material in at least one of (i) a common bond area, (ii) portions of one or more tabs of the roofing material that attach to the backer strip, or (iii) a combination of (i) and (ii).

Minimum Activation Temperature

Figure 5:
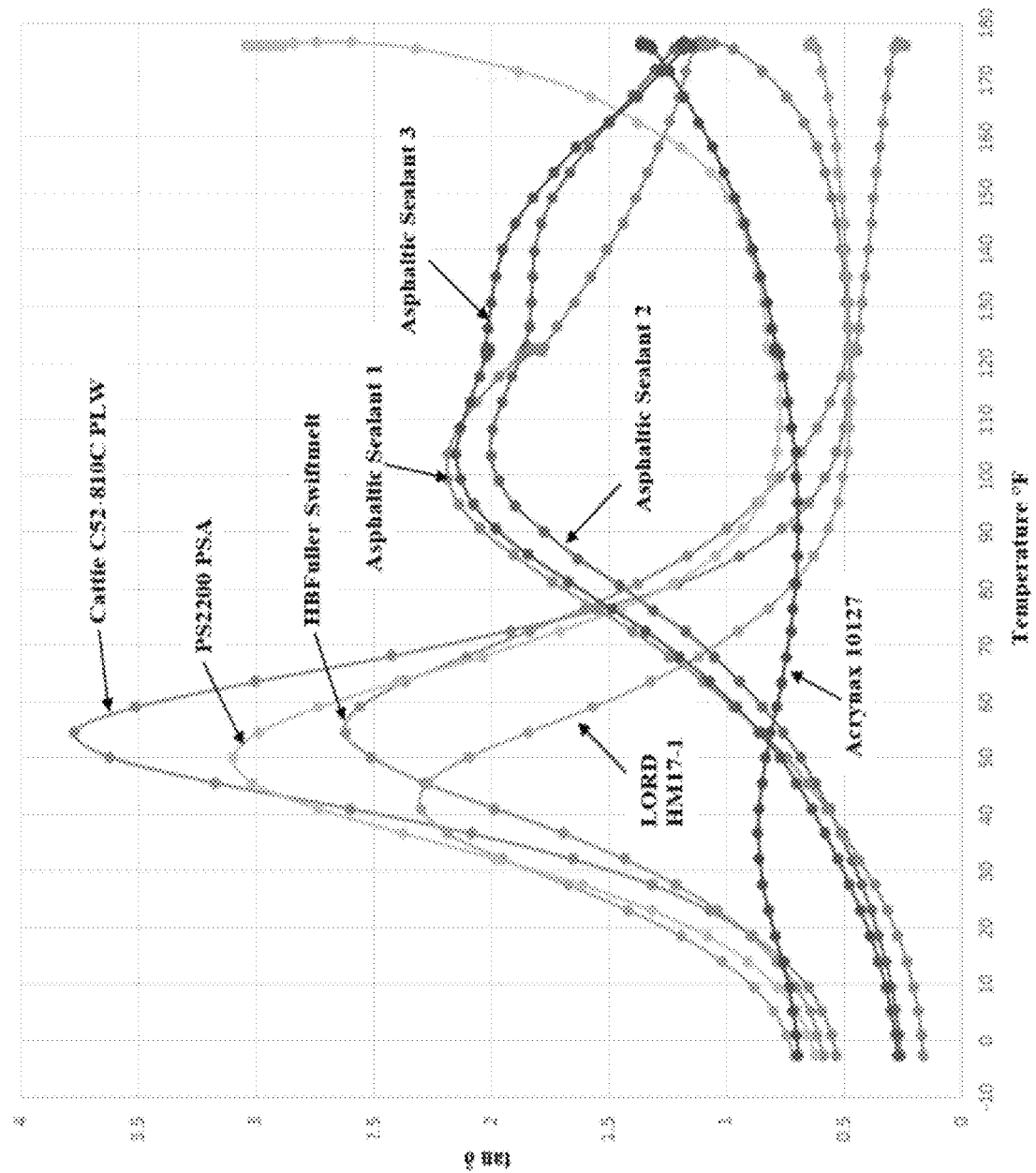
FIG. 5 is a graph illustrating the tan δ values (y-axis) for various sealants at certain temperatures (° F.) (x-axis) according to embodiments of the invention.

Embodiments of the invention provide roofing materials with a sealant that exhibits low temperature adhesion performance. According to embodiments of the invention, the sealants exhibit a minimum activation temperature (° C.) (tan δ>1) from −10° C. to 0° C. For clarity, when a sealant exhibits a tan δ value of greater than one (1) at a certain temperature, this indicates that the sealant is activated and able to form a bond with a material (e.g., a roofing material) in contact with the sealant. For example, FIG. 4 illustrates a table that compares the minimum activation temperature (° C.) (tan δ>1) of certain asphaltic sealants to that of non-asphaltic sealants according to embodiments of the invention. As shown in the table of FIG. 4, the non-asphaltic sealants according to embodiments of the invention exhibit minimum activation temperatures (° C.) (tan δ>1) of −10° C. to −5° C. (14° F. to 23° F.), while the asphaltic sealants exhibit minimum activation temperatures (° C.) (tan δ>1) of 17° C. to 20° C. (63° F. to 68° F.). See also, e.g., FIG. 5, which illustrates a graph that compares the tan δ values (y-axis) at certain temperatures (° F.) (x-axis) of the same asphaltic sealants to those of the non-asphaltic sealants according to embodiments of the invention. As shown in FIGS. 4 and 5, non-limiting examples of non-asphaltic sealants that exhibit minimum activation temperatures (° C.) (tan δ>1) of −10° C. to −5° C. (14° F. to 23° F.) according to embodiments of the invention include, for example, LORD® HM-17, which is a styrene-based adhesive available from LORD Corporation, Cary, NC; SWIFT®MELT 81570, which is a styrene-based adhesive available from H. B. Fuller, St. Paul MN; PS-2200 PSA, which comprises a styrene block copolymer that is available from Pro Pack Solutions, Inc., Loganville, GA; and Cattie C52-810C PLW, which comprises a styrene block copolymer that is available from Cattie Adhesives, Quakertown, PA.

In an embodiment, the sealant exhibits a minimum activation temperature (° C.) (tan δ>1) from −10° C. to 0° C. In an embodiment, the sealant exhibits a minimum activation temperature (° C.) (tan δ>1) from −10° C. to −1° C. In an embodiment, the sealant exhibits a minimum activation temperature (° C.) (tan δ>1) from −10° C. to −2° C. In an embodiment, the sealant exhibits a minimum activation temperature (° C.) (tan δ>1) from −10° C. to −3° C. In an embodiment, the sealant exhibits a minimum activation temperature (° C.) (tan δ>1) from −10° C. to −4° C. In an embodiment, the sealant exhibits a minimum activation temperature (° C.) (tan δ>1) from −10° C. to −5° C. In an embodiment, the sealant exhibits a minimum activation temperature (° C.) (tan δ>1) from −10° C. to −6° C. In an embodiment, the sealant exhibits a minimum activation temperature (° C.) (tan δ>1) from −10° C. to −7° C. In an embodiment, the sealant exhibits a minimum activation temperature (° C.) (tan δ>1) from −10° C. to −8° C. In an embodiment, the sealant exhibits a minimum activation temperature (° C.) (tan δ>1) from −10° C. to −9° C. In an embodiment, the sealant exhibits a minimum activation temperature (° C.) (tan δ>1) from −8° C. to 0° C. In an embodiment, the sealant exhibits a minimum activation temperature (° C.) (tan δ>1) from −8° C. to −1° C. In an embodiment, the sealant exhibits a minimum activation temperature (° C.) (tan δ>1) from −8° C. to −2° C. In an embodiment, the sealant exhibits a minimum activation temperature (° C.) (tan δ>1) from −8° C. to −3° C. In an embodiment, the sealant exhibits a minimum activation temperature (° C.) (tan δ>1) from −8° C. to −4° C. In an embodiment, the sealant exhibits a minimum activation temperature (° C.) (tan δ>1) from −8° C. to −5° C. In an embodiment, the sealant exhibits a minimum activation temperature (° C.) (tan δ>1) from −8° C. to −6° C. In an embodiment, the sealant exhibits a minimum activation temperature (° C.) (tan δ>1) from −8° C. to −7° C. In an embodiment, the sealant exhibits a minimum activation temperature (° C.) (tan δ>1) from −5° C. to 0° C. In an embodiment, the sealant exhibits a minimum activation temperature (° C.) (tan δ>1) from −5° C. to −1° C. In an embodiment, the sealant exhibits a minimum activation temperature (° C.) (tan δ>1) from −5° C. to −2° C. In an embodiment, the sealant exhibits a minimum activation temperature (° C.) (tan δ>1) from −5° C. to −3° C. In an embodiment, the sealant exhibits a minimum activation temperature (° C.) (tan δ>1) from −5° C. to −4° C. According to these embodiments, the sealant promotes low temperature adhesion, which can thus enhance bonding and/or low temperature wind resistance when the roofing materials are installed at cold temperatures.

Wind Uplift Resistance

Embodiments of the invention provide roofing materials with a sealant that exhibits low temperature adhesion performance, as well as roofing materials that exhibit increased wind uplift resistance when the sealant of an overlying roofing material is attached and cured at relatively low temperatures (e.g., less than 0° C. (40° F.)), to thereby form a stronger bond with the previously installed roofing material or the roof deck substrate. This increased wind uplift resistance allows for the roofing materials, which have a sealant that exhibits low temperature adhesion performance, to be installed at relatively low temperatures (e.g., less than 0° C. (40° F.)).

In an embodiment, the roofing material exhibits a wind uplift resistance, as measured according to ASTM D6381, of 5 lb-f to 63 lb-f. In an embodiment, the roofing material exhibits a wind uplift resistance, as measured according to ASTM D6381, of 5 lb-f to 60 lb-f. In an embodiment, the roofing material exhibits a wind uplift resistance, as measured according to ASTM D6381, of 10 lb-f to 60 lb-f. In an embodiment, the roofing material exhibits a wind uplift resistance, as measured according to ASTM D6381, of 20 lb-f to 60 lb-f. In an embodiment, the roofing material exhibits a wind uplift resistance, as measured according to ASTM D6381, of 30 lb-f to 60 lb-f. In an embodiment, the roofing material exhibits a wind uplift resistance, as measured according to ASTM D6381, of 40 lb-f to 60 lb-f. In an embodiment, the roofing material exhibits a wind uplift resistance, as measured according to ASTM D6381, of 50 lb-f to 60 lb-f. In an embodiment, the roofing material exhibits a wind uplift resistance, as measured according to ASTM D6381, of 5 lb-f to 50 lb-f. In an embodiment, the roofing material exhibits a wind uplift resistance, as measured according to ASTM D6381, of 10 lb-f to 50 lb-f. In an embodiment, the roofing material exhibits a wind uplift resistance, as measured according to ASTM D6381, of 20 lb-f to 50 lb-f. In an embodiment, the roofing material exhibits a wind uplift resistance, as measured according to ASTM D6381, of 30 lb-f to 50 lb-f. In an embodiment, the roofing material exhibits a wind uplift resistance, as measured according to ASTM D6381, of 40 lb-f to 50 lb-f. In an embodiment, the roofing material exhibits a wind uplift resistance, as measured according to ASTM D6381, of 5 lb-f to 40 lb-f. In an embodiment, the roofing material exhibits a wind uplift resistance, as measured according to ASTM D6381, of 10 lb-f to 40 lb-f. In an embodiment, the roofing material exhibits a wind uplift resistance, as measured according to ASTM D6381, of 20 lb-f to 40 lb-f. In an embodiment, the roofing material exhibits a wind uplift resistance, as measured according to ASTM D6381, of 30 lb-f to 40 lb-f. In an embodiment, the roofing material exhibits a wind uplift resistance, as measured according to ASTM D6381, of 5 lb-f to 30 lb-f. In an embodiment, the roofing material exhibits a wind uplift resistance, as measured according to ASTM D6381, of 10 lb-f to 30 lb-f. In an embodiment, the roofing material exhibits a wind uplift resistance, as measured according to ASTM D6381, of 20 lb-f to 30 lb-f. In an embodiment, the roofing material exhibits a wind uplift resistance, as measured according to ASTM D6381, of 25 lb-f to 30 lb-f. In an embodiment, the roofing material exhibits a wind uplift resistance, as measured according to ASTM D6381, of 5 lb-f to 25 lb-f. In an embodiment, the roofing material exhibits a wind uplift resistance, as measured according to ASTM D6381, of 10 lb-f to 25 lb-f. In an embodiment, the roofing material exhibits a wind uplift resistance, as measured according to ASTM D6381, of 20 lb-f to 25 lb-f. In an embodiment, the roofing material exhibits a wind uplift resistance, as measured according to ASTM D6381, of 5 lb-f to 20 lb-f. In an embodiment, the roofing material exhibits a wind uplift resistance, as measured according to ASTM D6381, of 10 lb-f to 20 lb-f.

According to an embodiment, the wind uplift resistance allows for the roofing materials to be adhered to an underlying roofing material and/or a roofing deck substrate with the sealant, according to embodiments of the invention, with minimal additional nailing and/or additional nailing being eliminated. For example, according to one embodiment, additional sealant lines can be applied to the back (unexposed side) of the headlap portion of the roofing material or shingle, such that the additional sealant can provide a direct load path between the shingle and the roof deck. As a result, wind loads can be transferred to the roof deck with fewer or no nails and/or fasteners.

Dahlquist Criterion Temperature

Embodiments of the invention provide roofing materials with a sealant that exhibits low temperature adhesion performance, as well as roofing materials that exhibit a certain Dahlquist criterion temperature. Dahlquist criterion temperature relates to the temperature at which a material, such as, e.g., a pressure sensitive material, achieves a sufficient elasticity modulus (i.e., an elasticity modulus (G') of $<3\times10^5$ Pa at room temperature) and thereby adhesion occurs. The Dahlquist criterion temperature is measured pursuant to the procedures discussed in Ir. Roelof Luth, "Defining Viscoelastic Adhesive Coordinates that Matter," https://www.p-stc.org/files/public/Luth_Roelof.pdf, which is incorporated by reference herein. According to embodiments of the invention, the sealant exhibited a Dahlquist criterion temperature of −5° C. (23° F.) to 0° C. (32° F.) (see, e.g., FIG. 4).

Peel Strength

Embodiments of the invention provide roofing materials with a sealant that exhibits low temperature adhesion performance, as well as roofing materials that exhibit a certain peel strength at certain temperatures, as discussed above. Peel strength, which is measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives," 41 (2013), pages 98-106, both of which are incorporated by reference herein, as discussed above, provides a measure of the average force required to pull part two bonded materials. Thus, according to embodiments of the invention, roofing materials are provided with a sealant that is activated and able to form a bond with another roofing material or the roof deck substrate at −10° C. to 0° C. (i.e., the minimum activation temperature discussed above), while also providing a peel strength at 25° C. (77° F.) and 60° C. (140° F.) that is comparable to that of a roofing material using a standard asphaltic sealant at these same temperatures (see, e.g., FIG. 4).

In an embodiment, the roofing material exhibits (i) a peel strength at 25° C. of $1\times10^4$ Pa (1.5 psi) to $1\times10^7$ Pa (1450 psi) and (ii) a peel strength at 60° C. of $1\times10^4$ Pa (1.5 psi) to $1\times10^6$ Pa (145 psi), with the peel strength being measured as discussed above. In some embodiments, the roofing material exhibits (i) a peel strength at 25° C. of $1\times10^6$ Pa (145 psi) to $6\times10^6$ Pa (900 psi), and (ii) a peel strength at 60° C. of $1\times10^4$ Pa (1.5 psi) to $4\times10^5$ Pa (60 psi).

In an embodiment, the roofing material exhibits a peel strength at 25° C. of $1\times10^4$ Pa (1.5 psi) to $1\times10^7$ Pa (1450 psi). In an embodiment, the roofing material exhibits a peel strength at 25° C. of $1\times10^6$ to $6\times10^6$ Pa. In an embodiment, the roofing material exhibits a peel strength at 25° C. of $1\times10^6$ to $5\times10^6$ Pa.

In an embodiment, the roofing material exhibits a peel strength at 60° C. of $1\times10^4$ Pa (1.5 psi) to $1\times10^6$ Pa (145 psi). In an embodiment, the roofing material exhibits a peel strength at 60° C. of $1\times10^4$ to $4\times10^5$ Pa. In an embodiment, the roofing material exhibits a peel strength at 60° C. of $1\times10^4$ to $5\times10^4$ Pa.

Shear Resistance

Embodiments of the invention provide roofing materials with a sealant that exhibits low temperature adhesion performance, as well as roofing materials that exhibit a certain shear resistance at a certain temperature(s), as discussed above. Sheer resistance, which is measured according to the procedure discussed in F. A. Mazzeo, "Characterization of Pressure Sensitive Adhesives by Rheology," TA Instruments Report RH082 (2002), pages 1-8, which is referenced by S. Sun et al., "A review of mechanical properties of pressure sensitive adhesives," International Journal of Adhesion and Adhesives," 41 (2013), pages 98-106, both of which are incorporated by reference herein, as discussed above, provides a measure of the strength of a material in resisting an applied shear load or force, which is generally a force that tends to produce a sliding failure on a material along a plane that is parallel to the direction of the force. Thus, according to embodiments of the invention, roofing materials are provided with a sealant that is activated and able to form a bond with another roofing material or the roof deck substrate at −10° C. to 0° C. (i.e., the minimum activation temperature discussed above), while also providing a shear resistance at 60° C. (140° F.) that is comparable to or greater than that of a roofing material using a standard asphaltic sealant at these same temperatures (see, e.g., FIG. 4).

In an embodiment, the roofing material exhibits a shear resistance at 60° C. of 200 Pa to 20,000 Pa. In an embodiment, the roofing material exhibits a shear resistance at 60° C. of 500 Pa to 20,000 Pa. In an embodiment, the roofing material exhibits a shear resistance at 60° C. of 750 Pa to 20,000 Pa. In an embodiment, the roofing material exhibits a shear resistance at 60° C. of 1000 Pa to 20,000 Pa. In an embodiment, the roofing material exhibits a shear resistance at 60° C. of 2500 Pa to 20,000 Pa. In an embodiment, the roofing material exhibits a shear resistance at 60° C. of 5000 Pa to 20,000 Pa. In an embodiment, the roofing material exhibits a shear resistance at 60° C. of 10,000 Pa to 20,000 Pa. In an embodiment, the roofing material exhibits a shear resistance at 60° C. of 15,000 Pa to 20,000 Pa. In an embodiment, the roofing material exhibits a shear resistance at 60° C. of 200 Pa to 15,000 Pa. In an embodiment, the roofing material exhibits a shear resistance at 60° C. of 500 Pa to 15,000 Pa. In an embodiment, the roofing material exhibits a shear resistance at 60° C. of 750 Pa to 15,000 Pa. In an embodiment, the roofing material exhibits a shear resistance at 60° C. of 1000 Pa to 15,000 Pa. In an embodiment, the roofing material exhibits a shear resistance at 60° C. of 2500 Pa to 15,000 Pa. In an embodiment, the roofing material exhibits a shear resistance at 60° C. of 5000 Pa to 15,000 Pa. In an embodiment, the roofing material exhibits a shear resistance at 60° C. of 10,000 Pa to 15,000 Pa.

Complex Viscosity

Figure 6:
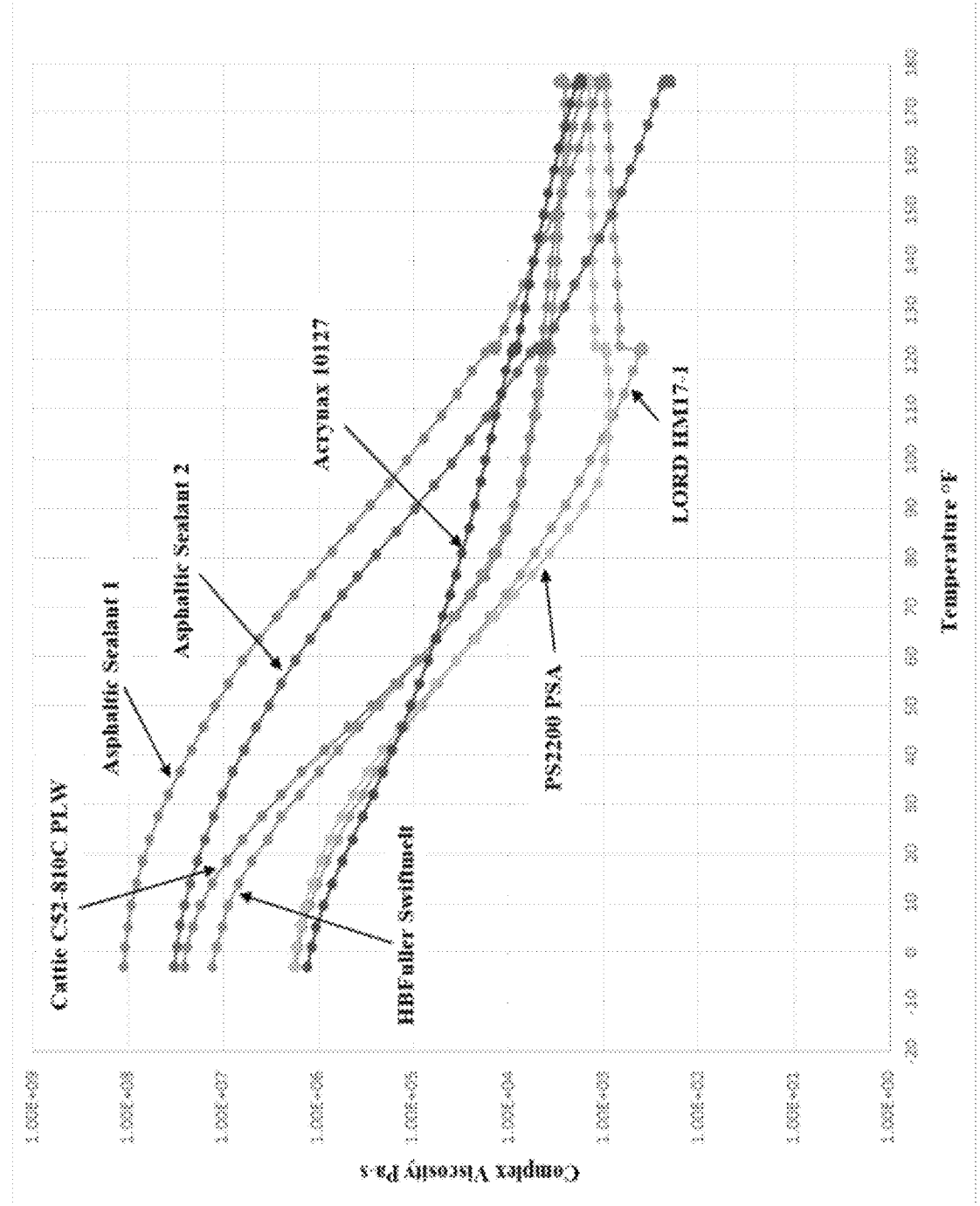
FIG. 6 is a graph illustrating the complex viscosity values (Pa-s) (y-axis) for various sealants at certain temperatures (° F.) (x-axis) according to embodiments of the invention.

Embodiments of the invention provide roofing materials with a sealant that exhibits a certain level of Complex Viscosity (Pa-S). Complex Viscosity, which is measured according to the methodology discussed in U.S. Pat. No. 10,358,824, which is incorporated by reference herein, provides an indicator of a material's flow properties. The complex viscosity of a sealant can be correlated to its ability to wet out the substrate, which has a direct impact on its adhesive performance (see, e.g., FIG. 6).

EXAMPLES

Specific embodiments of the invention will now be demonstrated by reference to the following examples. It should be understood that these examples are disclosed by way of illustrating the invention and should not be taken in any way to limit the scope of the present invention.

Example 1

Coupon Testing

The improved performance of non-asphaltic sealants according to embodiments of the invention on a shingle material (or coupon) was demonstrated with respect to a control shingle material (or coupon) that included a polymer-modified asphaltic sealant. The results of this example are shown in Tables 1 and 2 below, which illustrate tack temperature and activation temperature data and mechanical uplift data, respectively, of the shingle coupons or materials with the two types of sealant material.

TABLE 1

| Sealant Material | Tack Temp. (° F.) | Activation Temperature, lb-f | |
|---|---|---|---|
| | | 40° F. | 70° F. |
| Control (polymer-modified asphalt based) | 40 | 0 | 5.70 |
| LORD ® HM 17-1 | 40 | 0.84 | 6.64 |

Tack temperature is the temperature at which a sealant begins to form a bond with an adjoining surface (e.g., an adjacent shingle course or the roof deck substrate). If the upper coupon (or shingle material) shows any sign of an initial sealant contact bond, such as a lifting force, on the bottom coupon (or shingle material) then the sealant material is deemed to "PASS" at that conditioning temperature. A "FAILING" test indicates that no contact bond was exhibited at a particular temperature after conditioning.

Activation temperature relating to the bonding of shingles, which is based on ASTM D-6381, is defined as the force (lb-f) required to break the bond between two shingle coupons that have been conditioned for two (2) hours at a specified temperature, then cooled to ambient temperature. If the conditioning temperature is below the ambient temperature, then the coupons are tested immediately after conditioning.

As shown in Table 1 above, while the control shingle coupon with the polymer-modified asphaltic sealant exhibited a tack temperature at 40° F., this same control shingle coupon did not activate or show any reasonable force against coupon separation at that temperature (i.e., a 0 lb-f at an activation temperature of 40° F.). By contrast, as shown in Table 1 above, the shingle coupon having a non-asphaltic sealant according to an embodiment of the invention, exhibited both a tack temperature and a measurable resistance to uplift at 40F (0.84 lb-f), and further exhibited a better resistance to uplift compared to the control shingle coupon when conditioned at 70° F.

In terms of mechanical uplift, the comparative results between the two sealant materials are shown in Table 2 below. (Mechanical uplift testing was performed in accordance with ASTM D-6381.)

TABLE 2

| Material | Mechanical Uplift, lb-f |
|---|---|
| Control (polymer-modified asphalt based) | 29.98 |
| LORD ® HM 17-1 | 25.00 |

As shown in Table 2 above, both the control shingle coupon having the polymer-modified asphaltic sealant and the shingle coupon having a non-asphaltic sealant according to an embodiment of the invention exhibited a mechanical uplift resistance of greater than 20 lb-f, after conditioning.

Example 2

Low Temperature Conditioned Wind Testing on Shingle Test Decks

Two different types of production shingles were obtained from the GAF Ennis (TX) plant: (i) Timberline HDZ, which is made with oxidized asphalt; and (ii) ArmorShield II, which is made with polymer-modified asphalt. Both types of shingles did not have any asphalt-based sealant applied to them (i.e., blanks), in order to be able to apply to these shingles a non-asphaltic sealant according to an embodiment of the invention (i.e., LORD® HM 17-1 non-asphaltic sealant). The non-asphaltic sealant was applied to the shingles using a robotic die applicator.

Test decks of each type of shingle product were built, as shown in FIGS. 7A and 7B. The performance of the shingles having the non-asphaltic sealant according to an embodiment of the invention was tested under low temperature conditioning. The test procedure consisted of the following steps: (i) cool plywood deck and shingles separately to 40° F. for 16 hours; (ii) apply shingles to the deck at 40° F.; (iii) condition the deck for 16 hours at 40° F.; (iv) test the shingles applied to the deck at 30 mph wind speed for one (1) hour at 40° F.; and (v) if the shingles have not blown off of the deck after one (1) hour, increase the wind speed by 10 mph every 10 minutes until failure.

The results of the wind testing are shown in Table 3 below:

TABLE 3

| Shingle Type Having Non-Asphaltic Sealant According to an Embodiment of the Present Invention | 30 mph/60 min. | 40 mph/10 min. | 50 mph/10 min. |
|---|---|---|---|
| Timberline HDZ | PASS | PASS | PASS |
| ArmorShield II | PASS | PASS | PASS |

As shown in Table 3 above, each of the shingles that included the non-asphaltic sealant according to an embodiment of the invention was able to "PASS" the wind testing at 30 mph/60 min., 40 mph/10 min. and 50 mph/10 min. It is further noted that control shingles using a standard asphalt-based sealant could not be tested at the low temperatures discussed above, because these control shingles did not activate below 60° F. and thus, would automatically fail the wind test.

Example 3

Final Product Wind Testing

As in Example 2, two different types of production shingles were obtained from the GAF Ennis (TX) plant: (i) Timberline HDZ, which is made with oxidized asphalt; and (ii) ArmorShield II, which is made with polymer-modified asphalt. Both types of shingles did not have any asphalt-based sealant applied to them (i.e., blanks), in order to be able to apply to these shingles a non-asphaltic sealant according to an embodiment of the invention (i.e., LORD® HM 17-1 non-asphaltic sealant). The non-asphaltic sealant was applied to the shingles using a robotic die applicator.

Test decks of each type of shingle product were built, fully conditioned, and tested in accordance with ASTM D-3161. Wind testing was performed at the GAF Ennis, TX wind tunnel facility in accordance with ASTM D-3161. Results of the testing are shown in Table 4 below:

TABLE 4

| Shingle Type Having Non-Asphattic Sealant According to an Embodiment of the Present Invention | 110 mph/120 min. |
|---|---|
| Timberline HD | PASS |
| ArmorShield II | PASS |

As shown in Table 4 above, each of the shingles that included the non-asphaltic sealant according to an embodiment of the invention was able to "PASS" the wind testing at 110 mph/120 min.

Example 4

Shingles that can Directly Adhere to the Underlayment on a Roof Deck (Zero Nail Application)

Timberline HDZ shingle blanks (i.e., having no sealant applied thereto) were obtained from the GAF Ennis (TX) plant. LORD® HM 17-1 non-asphaltic sealant was applied to each of these shingles using a robotic die applicator. Three lines of sealant were applied to each of the shingles, as shown in FIG. 8.

Control shingles were also prepared using USP 3120 ("PMA Sealant"), a polymer-modified asphalt sealant provided by US Polyco (Ennis, TX). Three sealant lines, as shown in FIG. 8, of PMA Sealant were also applied to each of the control shingles.

Figure 9:
FIG. 9 is a photograph of test decks constructed with shingles having a sealant applied thereto according to embodiments of the invention.

Test decks were then constructed using each of these shingles and no nails. The decks consisted of five courses of shingles that were applied directly to an underlayment without any fasteners (see, e.g., FIG. 9). The performance of the shingles having the non-asphaltic sealant applied thereto was tested under low temperature conditioning with a low speed wind. The control shingles, however, were not wind tested as no bonding of the shingles to the deck was observed upon conditioning at 40° F.

The low temperature test procedure consisted of the following steps: (i) cool plywood deck and shingles separately to 40° F. for 16 hours; (ii) apply shingles to the deck at 40° F.; (iii) condition the deck for 16 hours at 40° F.; and (iv) test the shingles applied to the deck at 30 mph wind speed for one (1) hour at 40° F. The results, shown in Table 5 below, indicate that the non-asphaltic sealant according to an embodiment of the invention is suitable for a self-adhered application at ambient temperatures as low as 40° F.:

TABLE 5

| Sealant Line 1 | Sealant Line 2 | Sealant Line 3 | Result |
|---|---|---|---|
| PMA Sealant | PMA Sealant | PMA Sealant | Did not test (control) |
| LORD® HM 17-1 | LORD® HM 17-1 | LORD® HM 17-1 | PASS |

As a further test for the self-adhered shingles, wind testing according to ASTM D-3161 was conducted. Standard decks that conform to the ASTM D-3161 method, except that nails were omitted for the full shingle courses, were prepared and tested. The test deck with shingles having LORD® HM 17-1 non-asphaltic sealant passed the test, while the test deck with control shingles failed. The results of this test are shown in Table 6 below:

TABLE 6

| Sealant line 1 | Sealant line 2 | Sealant line 3 | Result |
| --- | --- | --- | --- |
| PMA Sealant | PMA Sealant | PMA Sealant | FAIL |
| LORD ® HM 17-1 | LORD ® HM 17-1 | LORD ® HM 17-1 | PASS |

As shown in Table 6 above, the results illustrate that the use of LORD® HM 17-1 non-asphaltic adhesive as a sealant provides the shingles with a wind resistance up to a 2-hour sustained wind speed of 110 mph without the use of nails.

Example 5

Coupon Testing

The performance of a non-asphaltic sealant (i.e., Acrynax 10127) ("NA Sealant") on a shingle material (or coupon) was demonstrated with respect to shingle materials (or coupons) that included a sealant having a polymer-modified asphaltic sealant (i.e., USP 3120) ("PMA Sealant") mixed with the same non-asphaltic sealant (i.e., Acrynax 10127) ("NA Sealant") at varying weight percentages. The results of this example are shown in the Table of FIG. 10, which illustrates softening point, viscosity, penetration, tack temperature data, activation temperature data, mechanical uplift data, and spread data (i.e., caliper loss and width increase), respectively, of the shingle coupons or materials prepared with the various sealant materials.

As shown in the Table of FIG. 10, the results illustrate that the shingle coupon having the non-asphaltic sealant (Sample 1), as well as two of the shingle coupons with the prepared sealants (Samples 3 and 4) having a polymer-modified asphaltic sealant (i.e., USP 3120) ("PMA Sealant") mixed with the same non-asphaltic sealant (i.e., Acrynax 10127) ("NA Sealant") at varying weight percentages, exhibited a tack temperature at 40° F. As also shown in the Table of FIG. 10, the shingle coupon having the non-asphaltic sealant, as well as the shingle couples having the sealants of varying amounts of polymer-modified asphaltic sealant and non-asphaltic sealant, all exhibited a mechanical uplift resistance of greater than 20 lb-f.

Although the invention has been described in certain specific exemplary embodiments, many additional modifications and variations would be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

We claim:

1. A roofing shingle comprising:
   (a) a coated substrate that is coated on a front surface and a back surface with a coating that comprises at least one of an asphaltic coating, a non-asphaltic coating, a polymer-modified asphalt coating, or a combination thereof;
   (b) a backer strip attached to the back surface of the coated substrate; and
   (c) a single sealant applied to the backer strip of the coated substrate,
   wherein the single sealant is a non-asphaltic sealant that is free of asphalt,
   wherein the single sealant exhibits a minimum activation temperature (° C.) (tan δ>1) from −10° C. to 0° C., and
   wherein the single sealant is configured to adhere the roofing shingle to at least one of (i) an underlying roofing shingle and (ii) a roofing deck substrate.

2. The roofing shingle according to claim 1, wherein the single sealant comprises at least one polymer.

3. The roofing shingle according to claim 2, wherein the least one polymer comprises a styrene block copolymer.

4. The roofing shingle according to claim 2, wherein the single sealant further comprises at least one of (i) resins, (ii) plasticizers, (iii) fillers, (iv) tackifiers, (v) other modifiers or (vi) combinations thereof.

5. The roofing shingle according to claim 1, wherein the roofing shingle is one of (i) an asphaltic shingle, (ii) a non-asphaltic shingle, and (ii) a polymer-modified asphalt shingle.

6. The roofing shingle according to claim 1, wherein the substrate comprises one of a fiberglass mat, a polyester mat, a scrim, a coated scrim, or a combination thereof.

7. The roofing shingle according to claim 1, further comprising granules.

8. The roofing shingle according to claim 1, further comprising an adhesive for adhering the back surface of the coated substrate to the backer strip of the roofing shingle.

9. The roofing shingle according to claim 8, wherein the adhesive has the same composition as the single sealant.

10. The roofing shingle according to claim 1, wherein the single sealant exhibits a minimum activation temperature (° C.) (tan δ>1) from −10° C. to −5° C.

11. The roofing shingle according to claim 1, wherein the roofing shingle exhibits a wind uplift resistance, as measured according to ASTM D6381, of 5 lb-f to 63 lb-f.

12. The roofing shingle according to claim 1, wherein the roofing shingle exhibits a shear resistance at 60° C. of 200 Pa to 20,000 Pa.

13. The roofing shingle according to claim 1, wherein the roofing shingle exhibits (i) a peel strength at 25° C. of $1\times10^6$ to $6\times10^6$ Pa, and (ii) a peel strength at 60° C. of $1\times10^4$ to $4\times10^5$ Pa.

14. The roofing shingle according to claim 1, wherein the single sealant is applied to the backer strip along a lower edge in order to contact a sealant attachment portion of the underlying roofing shingle.

15. The roofing shingle according to claim 1, wherein the single sealant is the only sealant applied to the roofing shingle for adhering the roofing shingle to the at least one of (i) an underlying roofing shingle and (ii) a roofing deck substrate.

16. The roofing shingle according to claim 1, wherein the front surface of the coated substrate includes a sealant attachment portion configured to contact a sealant of an overlying roofing shingle.

17. A roofing shingle comprising:
   (a) a coated substrate that is coated on a front surface and a back surface with a coating that comprises at least one of an asphaltic coating, a non-asphaltic coating, a polymer-modified asphalt coating, or a combination thereof;
   (b) a backer strip attached to the back surface of the coated substrate; and
   (c) a single sealant applied to the backer strip of the coated substrate, the single sealant comprising a styrene polymer or copolymer and a filler,
   wherein the single sealant is a non-asphaltic sealant that is free of asphalt,
   wherein the single sealant exhibits a minimum activation temperature (° C.) (tan δ>1) from −10° C. to 0° C., and wherein the single sealant is configured to adhere the roofing shingle to at least one of (i) an underlying roofing shingle and (ii) a roofing deck substrate.

18. The roofing shingle according to claim 17, wherein the sealant further comprises at least one of (i) resins, (ii) plasticizers, (iii) fillers, (iv) tackifiers, (v) other modifiers or (vi) combinations thereof.

19. The roofing shingle according to claim 17, wherein the sealant is the only sealant applied to the roofing shingle for adhering the roofing shingle to the at least one of (i) an underlying roofing shingle and (ii) a roofing deck substrate.

20. A roofing system comprising:
   (a) a first roofing shingle comprising:
      (i) a coated substrate that is coated on a front surface and a back surface with a coating that comprises at least one of an asphaltic coating, a non-asphaltic coating, a polymer-modified asphalt coating, or a combination thereof;
      (ii) a backer strip attached to the back surface of the coated substrate; and
      (iii) a single sealant applied to the backer strip of the coated substrate,
      wherein the single sealant is a non-asphaltic sealant that is free of asphalt, and
      wherein the single sealant exhibits a minimum activation temperature (° C.) (tan δ>1) from −10° C. to 0° C.; and
   (b) a second roofing shingle, wherein the second roofing shingle is adhered to the first roofing shingle via the single sealant.

* * * * *